(12) United States Patent
Ely (10) Patent No.: US 8,065,536 B2
(45) Date of Patent: Nov. 22, 2011

(54) DUAL MODE POWER-SAVING COMPUTING SYSTEM

(75) Inventor: Omar Nathaniel Ely, Bergen (NO)

(73) Assignee: Cupp Computing AS, Bergen (NO)

( * ) Notice: Subject to any disclaimer, the term of this patent is extended or adjusted under 35 U.S.C. 154(b) by 206 days.

(21) Appl. No.: 12/087,609

(22) PCT Filed: Jan. 10, 2008

(86) PCT No.: PCT/NO2007/000010
§ 371 (c)(1),
(2), (4) Date: Mar. 27, 2009

(87) PCT Pub. No.: WO2007/081218
PCT Pub. Date: Jul. 19, 2007

(65) Prior Publication Data
US 2009/0193243 A1     Jul. 30, 2009

Related U.S. Application Data

(60) Provisional application No. 60/757,472, filed on Jan. 10, 2006.

(51) Int. Cl.
G06F 1/26     (2006.01)
G06F 1/32     (2006.01)

(52) U.S. Cl. ........ 713/300; 713/320; 713/323; 713/324; 712/1

(58) Field of Classification Search ........... 713/300, 713/320, 323, 324; 712/1
See application file for complete search history.

(56) References Cited

U.S. PATENT DOCUMENTS

| | | | |
|---|---|---|---|
| 6,035,408 A | 3/2000 | Huang | |
| 6,058,434 A | 5/2000 | Wilt et al. | |
| 6,240,521 B1 | 5/2001 | Barber et al. | |
| 6,631,474 B1 * | 10/2003 | Cai et al. | 713/300 |
| 2002/0095609 A1 | 7/2002 | Tokunaga | |
| 2002/0129288 A1 | 9/2002 | Loh et al. | |
| 2003/0065734 A1 | 4/2003 | Ramakesavan | |
| 2003/0088800 A1 | 5/2003 | Cai | |
| 2003/0100340 A1 | 5/2003 | Cupps et al. | |
| 2003/0224768 A1 | 12/2003 | Adjamah | |
| 2005/0066209 A1 * | 3/2005 | Kee et al. | 713/323 |
| 2005/0132239 A1 * | 6/2005 | Athas et al. | 713/300 |
| 2005/0182980 A1 | 8/2005 | Sutardja | |
| 2006/0294401 A1 * | 12/2006 | Munger | 713/300 |

FOREIGN PATENT DOCUMENTS

| | | |
|---|---|---|
| GB | 2 382 180 | 5/2003 |
| GB | 2382180 | 5/2003 |
| WO | WO 03100546 | 10/2003 |
| WO | 03/100546 | 12/2003 |
| WO | 2004/064119 | 7/2004 |

OTHER PUBLICATIONS

International Search Report mailed May 16, 2007 for International Application No. PCT/NO2007/000010.
International Preliminary Report on Patentability mailed May 16, 2008 for International Application No. PCT/NO2007/000010.
International Search Report of PCT/NO2007/000010 dated May 16, 2007.

* cited by examiner

Primary Examiner — Thomas Lee
Assistant Examiner — Michael J Brown
(74) Attorney, Agent, or Firm — Hamilton, Brook, Smith & Reynolds, P.C.

(57) ABSTRACT

The present invention relates to a data processing system comprising both a high performance computing sub-system having typical high power consumption and a low performance subsystem requiring less power. The data processing system acts as a single computing device by moving the execution of software from the low performance subsystem to the high performance subsystem when high computing power is needed and vice versa when low computing performance is sufficient, allowing in the latter case to put the high performance subsystem into a power saving state. The invention relates also to related algorithms.

25 Claims, 7 Drawing Sheets

A first procedure executed on said first subsystem comprising the steps

| 300 | Gathering information about a first state of said main operation on said first subsystem comprising allocated resources |

| 310 | Saving said first state information to a storage means shared by both subsystems |

| 320 | Closing down said main operation on said first subsystem comprising releasing resources |

A second procedure executed on said second subsystem comprising the steps:

| 330 | Fetching said stored information about said first state of said main operation from said shared storage means |

| 340 | Starting up said main operation on said second subsystem comprising allocating resources according to said saved state information |

| 350 | Establishing a second state on said second subsystem corresponding to said first state information. |

| 360 | Saving said second state information to a storage means shared by both subsystems |

Fig 8

DUAL MODE POWER-SAVING COMPUTING SYSTEM

The present application is a U.S. National Stage Application of International Application No. PCT/NO2007/000010 filed on Jan. 10, 2007, which claims priority to U.S. Provisional Application No. 60/757,472 filed on Jan. 10, 2006.

TECHNICAL FIELD

The present invention relates to computer hardware and software. Specifically it relates to a computer system architecture to reduce electrical power consumption.

BACKGROUND AND PRIOR ART

With ever increasing computing power—increased clock frequency, more memory, wider data paths—also power consumption of computing equipment has increased. This in turn requires increased effort in removal of dissipated heat from the electronic components but also larger power supplies or—in case of mobile equipment—better energy storage (batteries). Many innovations have been implemented to reduce power consumption, but still the typical laptop drains its battery in less than a working day.

Besides reduction of power requirements in the field of the basic electronics (lower operational voltage for circuits f inst), some work has been done to also save power by simply powering down/switching off parts of a complex computing system when those parts are not needed for the current operation. The dichotomy is that computers often stand idle but consuming large amounts of power to maintain powerful processing capacitates, which is used only upon occasion. Many individuals computing needs could be met with little more than a smart-phones computing capacity.

Some attempts to address this issue have been made:

The international patent application WO2004064119 relates to a dual processor architecture—"Dualcor"—with two different processors and two operating systems (OS). These processors in this application are integrated on a single chip and share memory and graphics systems.

The Dualcor most resembles Intel patent number 20030088800 with the exception that it uses two OS to facilitate handheld use (read functionality) and reduced power consumption. Its claims are very similar to that of the Dualcor patent application.

An application presented by Marvell World, 20050182980 integrates a PDA (Personal digital Assistant) on to a Notebook computer, allowing the user to access the personal information management (PIM), email, and media (music) on a secondary screen with a several button input while allowing the x86 system to remain off, thus saving power. The computer includes a primary processor, a primary memory, and a primary input/output (I/O) interface that communicates with the primary processor and the primary memory. A primary display communicates with the primary I/O interface. The primary processor, the primary memory, and the primary display are operated in active and inactive modes and powered down when the computer is in the inactive mode. A secondary processor dissipates less power than the primary processor. A secondary display communicates with the secondary processor. The secondary processor and the secondary display are powered up when the computer is in the inactive mode. The secondary processor and display support PDA-like functionality when the computer is in the inactive mode.

The US patent application 20020129288 discloses a computing device having a low power secondary processor coupled to a keyboard controller for the primary applications: Media Notebooks—Instant on DVD/TV, which is designed to be installed over existing x86 systems. As such it does not have access to system components such as USB. In point 0017 of the patent it does provide for network connections, this seems to be directed toward connection to the Internet. The patent makes a full range of system peripheries available to the "secondary processor".

Another US patent application 20030088800 presents a multi-processor mobile computer system having one low power processor integrated within a "highly integrated chipset" (Combined Northbridge and Southbridge) and a conventional main processor, thus creating a computer system having two processors of different clock frequencies and different levels of power consumption. An interface circuit can select one of the two processors to operate at a time to reduce power consumption without compromising the system performance.

Still there is a need for improving the prior art, which the present invention will do in several aspects.

SUMMARY

The present invention relates to a data processing system comprising a high-performance computing subsystems HP involving generally high power consumption and a low-performance computing subsystems LP having low power consumption. The invention is characterized in that the data processing system acts as a single computing device by moving the execution of a main operation alternatively to the high-performance subsystems HP when high computing performance is needed or the low-performance subsystems LP when low computing performance is sufficient. In the latter case the high-performance HP subsystems can be put into a power saving state.

The invention relates also to a method to coordinate a LP subsystem and a HP subsystem in a data processing system in order to transparently move a software between the subsystems making the subsystems to act as a single computing device. After an initial booting step (a) bringing the LP subsystem from off 200 to power-on 205 and keeping the HP subsystem powered-off 210 the method enters 215 a wait state (b), 220. On need for high computing performance 225, said HP subsystem is booted 230, 235 entering a booted state 240. In the next step control of user interface means is transferred to the HP subsystem and the software to be executed is started 245, 250, 255, 260. In a situation of annulment of the need 265 for high computing performance, control of the user interface means is transferred to the LP subsystem, the software is stopped and resources released 270, 275. Then the HP subsystem is transferred into a power-saving mode and the method brings the system finally back to the wait state of step (b) 280, 285, 220.

The invention relates further to a method to coordinate at least two sub-systems in a data processing system in order to transparently move an active main operation between those subsystems making those subsystems to act as a single computing device. This is done by two procedures, wherein the first procedure executes on the first subsystems and comprises the steps of (a) gathering information about the state of the main operation on the first subsystems, which comprises the state of allocated resources, (b) saving this state information to a storage means shared by both subsystems and (c) closing down the main operation on the first subsystems comprising releasing resources. The second procedure executing on a second subsystems comprises the steps of (i) fetching the saved information about the first state of the main operation from the shared storage means, (ii) starting up the main operation on the second subsystems comprising allocating resources according to the saved state information, and (iii) establishing a state on the second subsystems corresponding to the information about the first state.

BRIEF DESCRIPTION OF THE DRAWINGS

Below the present invention will be described in greater detail with reference to the attached drawings, in which.

DETAILED DESCRIPTION OF PREFERRED EMBODIMENTS

Preferred embodiments of the present invention will now be described in detail with reference to the attached drawings.

The circumstance of unwanted high power consumption creates an opening for a computing system which is comprised of a high performance subsystem and a low performance subsystem. These two subsystems are then merged via hardware and software integration to create a single system.

In the industry standard situation, the invention can be implemented—but is not limited to it—in the x86 architecture best known as the PC architecture using the industry standard Intel x86 processor family or compatible processors which is used throughout this document as an example, but not limitation, for a high-performance, high-powered processor. The x86 architecture comprises the so-called Northbridge organizing the access of the central processor to internal volatile memory, the graphic processing and to the so-called Southbridge. The Southbridge handles all other IO and system management. The Northbridge and the above mentioned equipment attached to it, can be considered as the high-performance subsystem HP. Then, according to the present invention, a low-performance subsystem can be connected to or integrated into the Southbridge using a low-power, low-performance processor. This could for instance be an industry-standard ARM RISC-processor which will be used as an example, but not limitation in this document.

Figure 1:
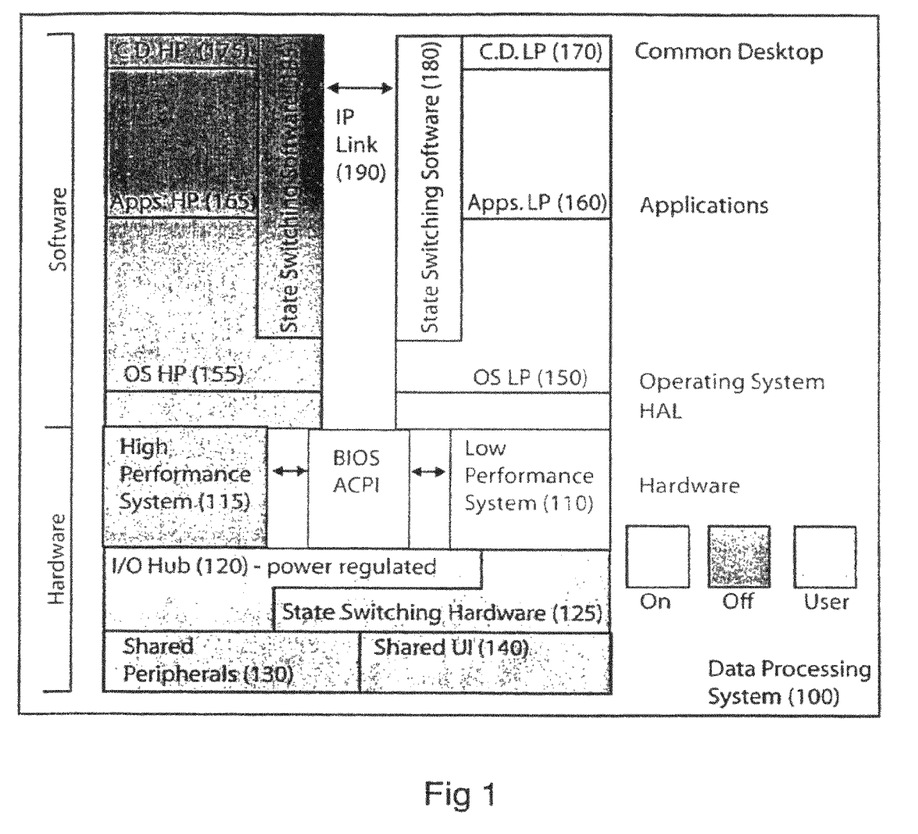
FIG. 1 shows the block diagram of the complete data processing system structured in hardware, software, low-performance and high-performance sub-systems and shared equipment.

FIG. 1 shows a block diagram of a data processing system 100 comprising on the left side a high-performance computing subsystem HP with both a hardware part below and a software part above. Typical in computer electronics, high-performance equipment—everything else being equal—has high power consumption. The right side of the diagram shows a corresponding low-performance subsystem LP having lower power consumption compared with the high-performance subsystem HP. Both software and hardware are divided into layers with the common desktop 170, 175 at top, making the data processing system as a whole appear to the user substantially as a single computing device. Below the common desktop is the application layer 160, 165 followed by the operating-system. By moving the execution of software in the application layer to the low-performance, low-power subsystem as long as it still performs according to the user's expectation the high-performance subsystem HP can be set into a different state which conserves power or even be switched off completely when the low-performance subsystem executes the software.

In any case the low-performance subsystem LP is always active and runs the basic administration of the total system, and also 'Always-On' devices like any communication equipment (GPS, RF-modules, network interfacing components—NIC, WiFi, Bluetooth, GPRS, CDMA . . . ) may be connected to the LP sub-system. The operating systems (OS) 150,155 running on the subsystems are adapted to their respective computing performance and tasks.

To give the user the impression of working on a single computing device, it is important to retain a user interface and a use of peripheral devices independent, on which one of the subsystems the software is executed. To achieve this, the display means (typically a LCD-screen) is controlled by the low-performance subsystem LP while the high-performance subsystem HP is in a power saving/hibernating/off state, and by the high-performance subsystem HP while the HP subsystem is executing the software application or user programs—also called "main operation"—requiring high-performance computing resources.

As rather independent (sub-) systems of their own with largely different requirements for performance and power consumption, both systems comprise their own main processor, graphical processor and storage adapted to the specific requirements.

For further supporting the cooperation of the operating system of both sub-systems, at least one communication link 190 (IP link) interconnects the high-performance subsystem HP with the low-performance subsystem LP. This communication link 190 can provide a connection from the low-performance subsystem LP to the high-performance HP subsystem. This link uses IP/TCP or other protocols to link the two systems together. Although diagrammed in the software layer, the physical link is between I/O areas of respective systems. Peripheral devices can be shared using this link or by using a wider connection on the I/O Hub. This is dependent upon required system performance.

The subsystems typically share a common basic input/output system (BIOS) and an Advanced Configuration and Power Interface (ACPI).

The decision on which of the subsystems the-execution of the application program shall be moved to, is in one preferred embodiment indicated by a 'switch' 180,185, being a physical switch, a selector item as a part of the user interface on the computer display, or a result of software based evaluating a set of predetermined factors internal to the data processing system.

The switch changes typically the connection 125 of peripheral devices to that subsystem which is intended to execute the application program. This will allow the system to function in two distinct modes, each of which will be recognized by all peripheral devices as "Master" of the system depending on which CPU is active.

Figure 2:
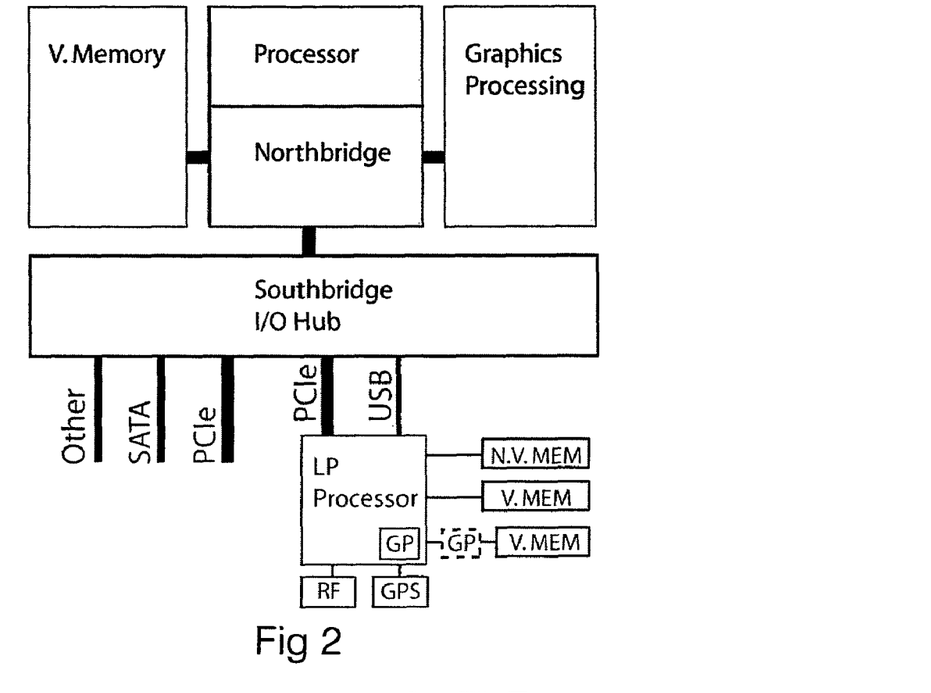
FIG. 2 shows a block diagram of the system more specifically aimed at the x86 architecture, presenting the low-performance processor connected to the I/O hub by PCI e and USB interface.
Figure 3:
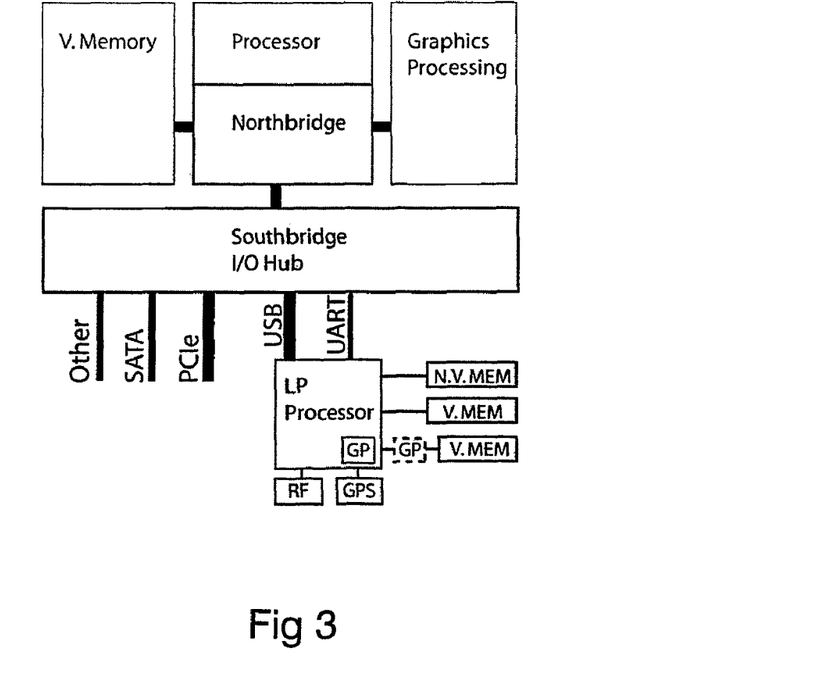
FIG. 3 gives a similar view as FIG. 2, but the LP-processor connects using USP and UART.

FIGS. 2 and 3 show a block diagram of the x86 architecture. Processor, volatile memory and graphics processing means are connected together and to the Southbridge by the Northbridge. The Southbridge acts as an I/O-hub for a number of protocols (SATA, PCIe, USB . . . ) and provides connectivity also for the low-performance subsystem LP. In FIG. 2 this connectivity is as an example provided by a PCIe, forming the link to access the HP subsystem peripheral devices, and a USB channel used to transmit and receive data across the IP link 190, while FIG. 3 uses USB and UART for the same purposes.

Figure 6:
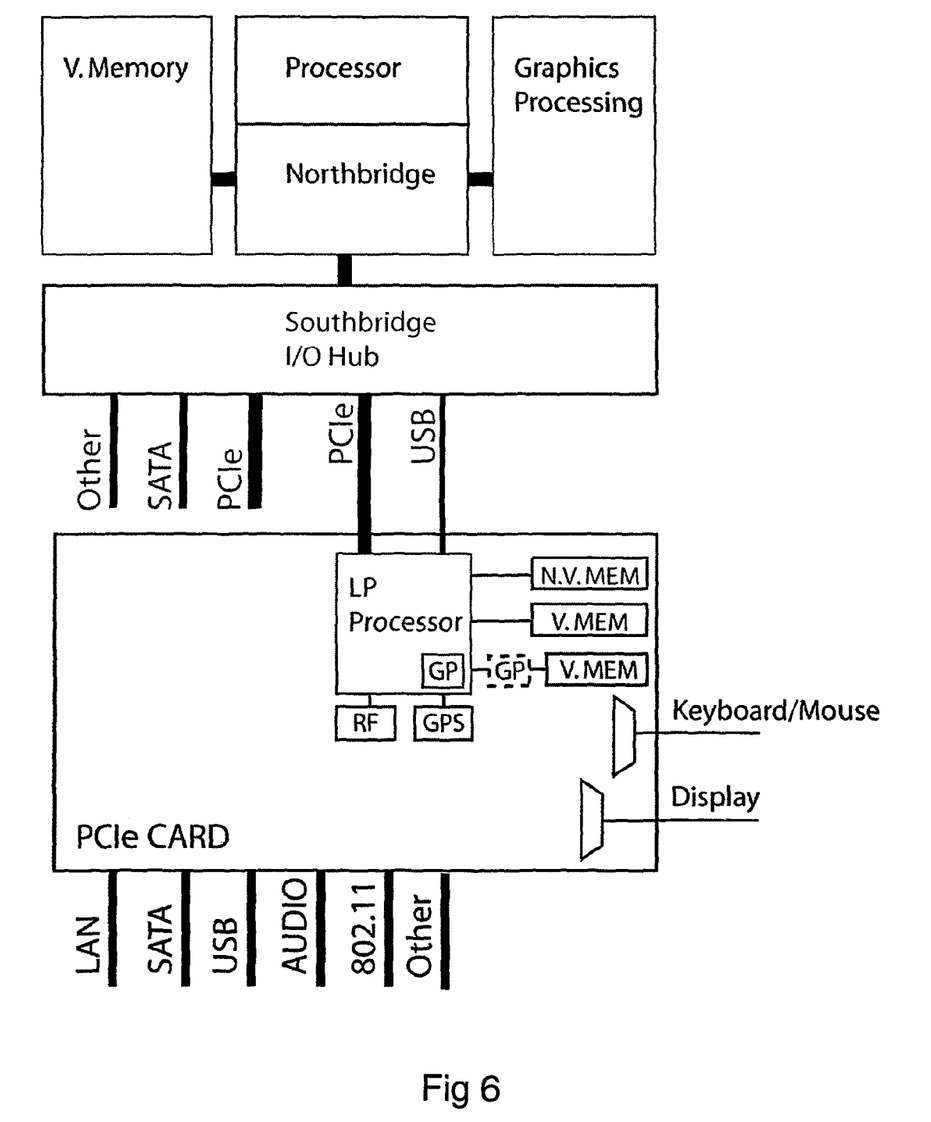
FIG. 6 illustrates an implementation as PCIe-card (=PCI express) for the x86 architecture.

The FIGS. 2 and 3 indicate an implementation of the low-performance subsystem on the motherboard being a chip that sits next to the Southbridge and interfaces via any number of protocols while FIG. 6 indicates the LP-subsystem being a detachable unit (PDA and the like), equipped with UI inputs (Keyboard, touchscreen, jog wheel, "five way directional pad" or similar inputs and display.), power source, antennas for embedded RF devices, ports, small screen UI suited to its form factor and use and other features characteristic of the product category.

Figure 4:
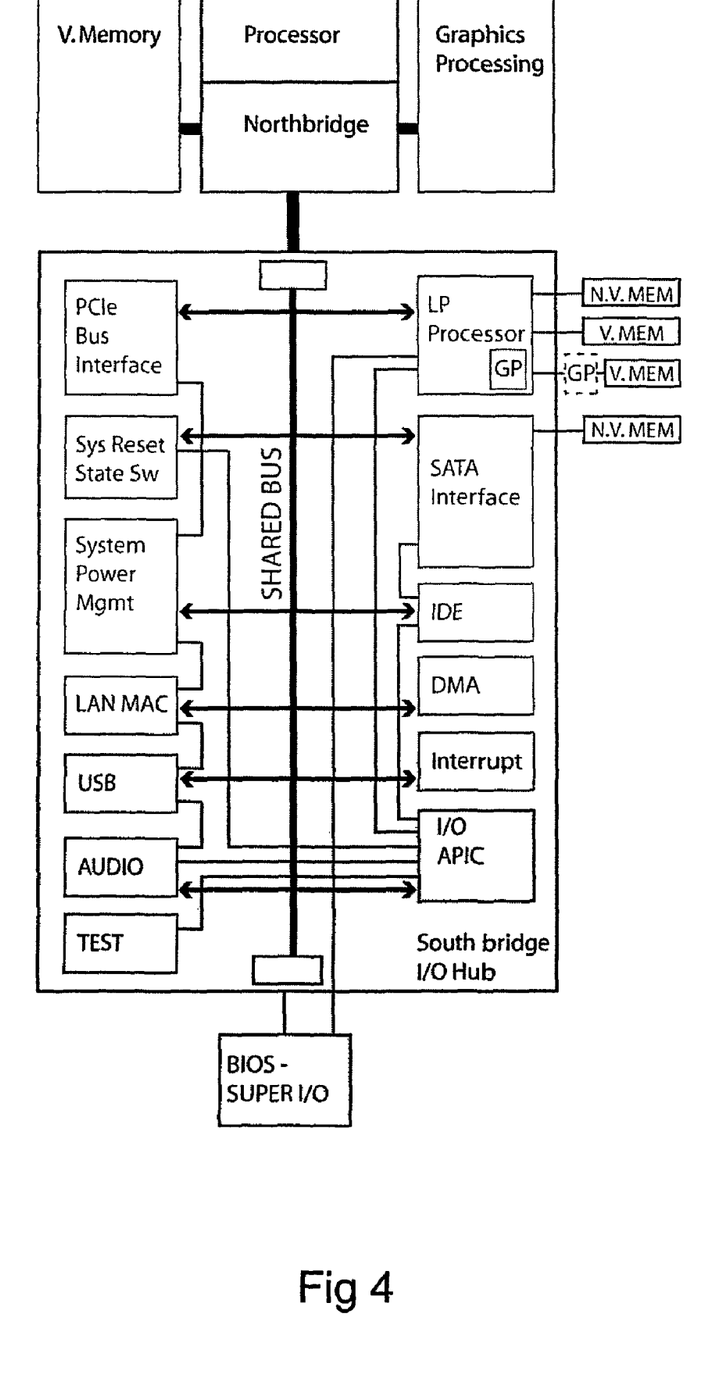
FIG. 4 shows the block diagram of a x86—"Southbridge" with the LP processor integrated.

FIG. 4 shows the block diagram of one possible embodiment of the present invention where the low-performance subsystem LP is implemented as a part of the x86 architecture Southbridge, this Southbridge also called the input/output hub 120. An internal shared bus connects all internal I/O interface modules (PCIe, LAN, USB, AUDIO, SATA, IDE, DMA) and internal system administration modules (RESET, POWER, TEST, INTERRUPT, APIC) with the Northbridge, the BIOS and the integrated low-performance processor (ARM for instance), which in turn connects to external non-volatile memory, volatile memory, graphics, radio equipment and possibly more.

FIG. 6 shows an embodiment of the invention where the low-performance system is implemented as a PCIe card—both standard format and mini-PCIe for notebooks are possible. In addition to the components mentioned above in connection with the description of the other embodiments, here the card also comprises keyboard, mouse and display connectors and furthermore LAN, SATA, USB, AUDIO, network and other connectors enabling it to act as a low-performance, low-power subsystem LP according to the principles of the present invention. As being able already today, they could listen to network wake-up signals, but unlike today, they would in many cases not need to wake up the complete workstation, but rather do the requested job on their own.

Figure 7:
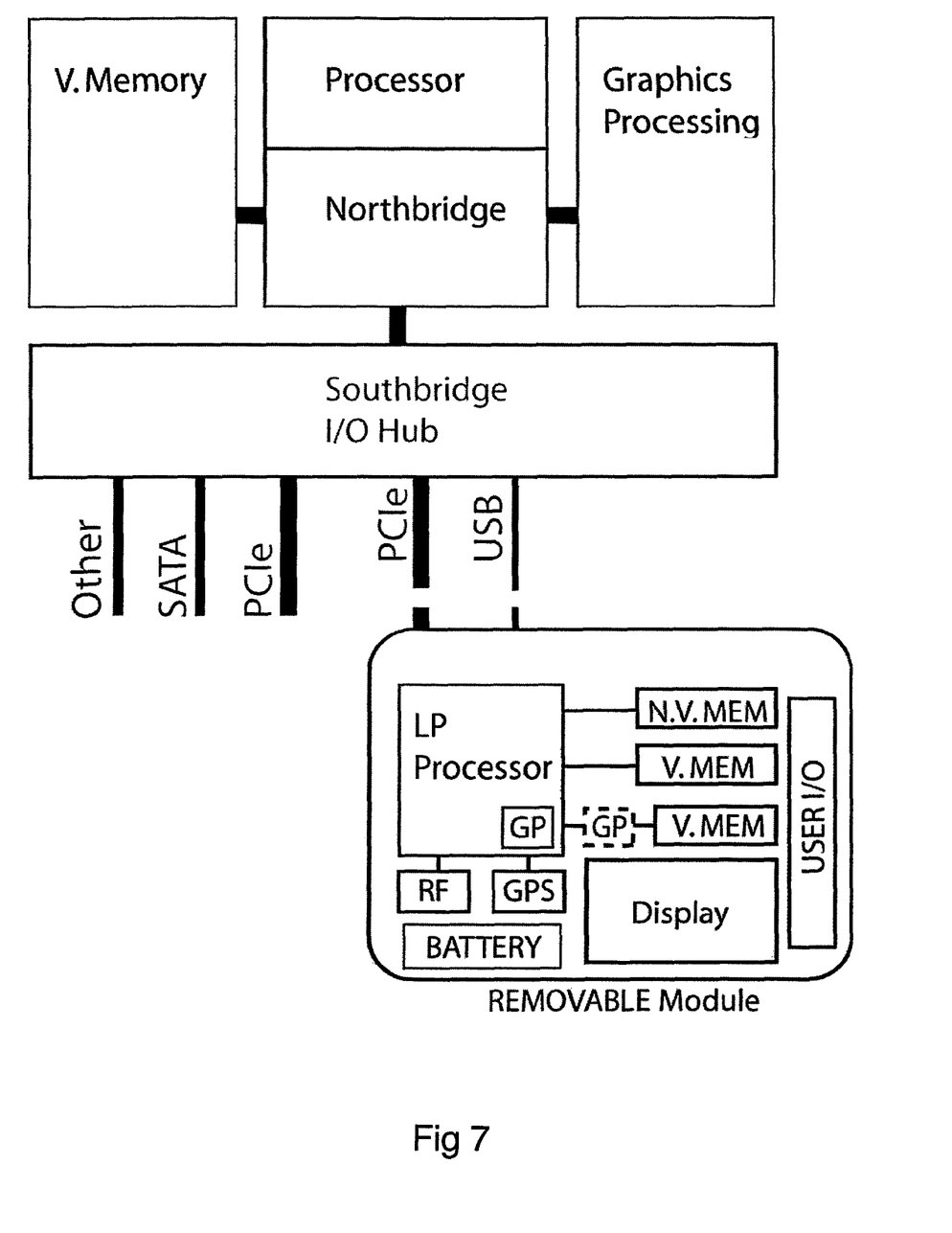
FIG. 7 presents a block diagram for a detachable, stand-alone, low-performance module implementation; while FIG. 8 corresponds to two procedures used in synchronizing both subsystems.

FIG. 7 illustrates an embodiment of the invention, where the low-performance subsystem LP—together with an additional power supply and user interface means—forms a removable stand-alone data processing system like a PDA, Smartphone or the like, which together with a substantially larger unit provides a full-featured computing environment, but removed from this full-featured computing environment provides an ultra-portable minor-performance computing unit.

As a further embodiment of the invention, the presence of a second distinct CPU is used for multitasking and server client/protocols within the system where for example, tasks which are performed more power-efficiently on an ARM processor, can be handled by the secondary processor even when the x86 is active. In one case ARM functions as a slave processor for the x86, handling always on task such as GPRS, GPS and other radios, an Audio could also be handled by the ARM if so chosen. In another case the ARM would function as a server for the x86 system exposing services to the HP OS.

Figure 5:
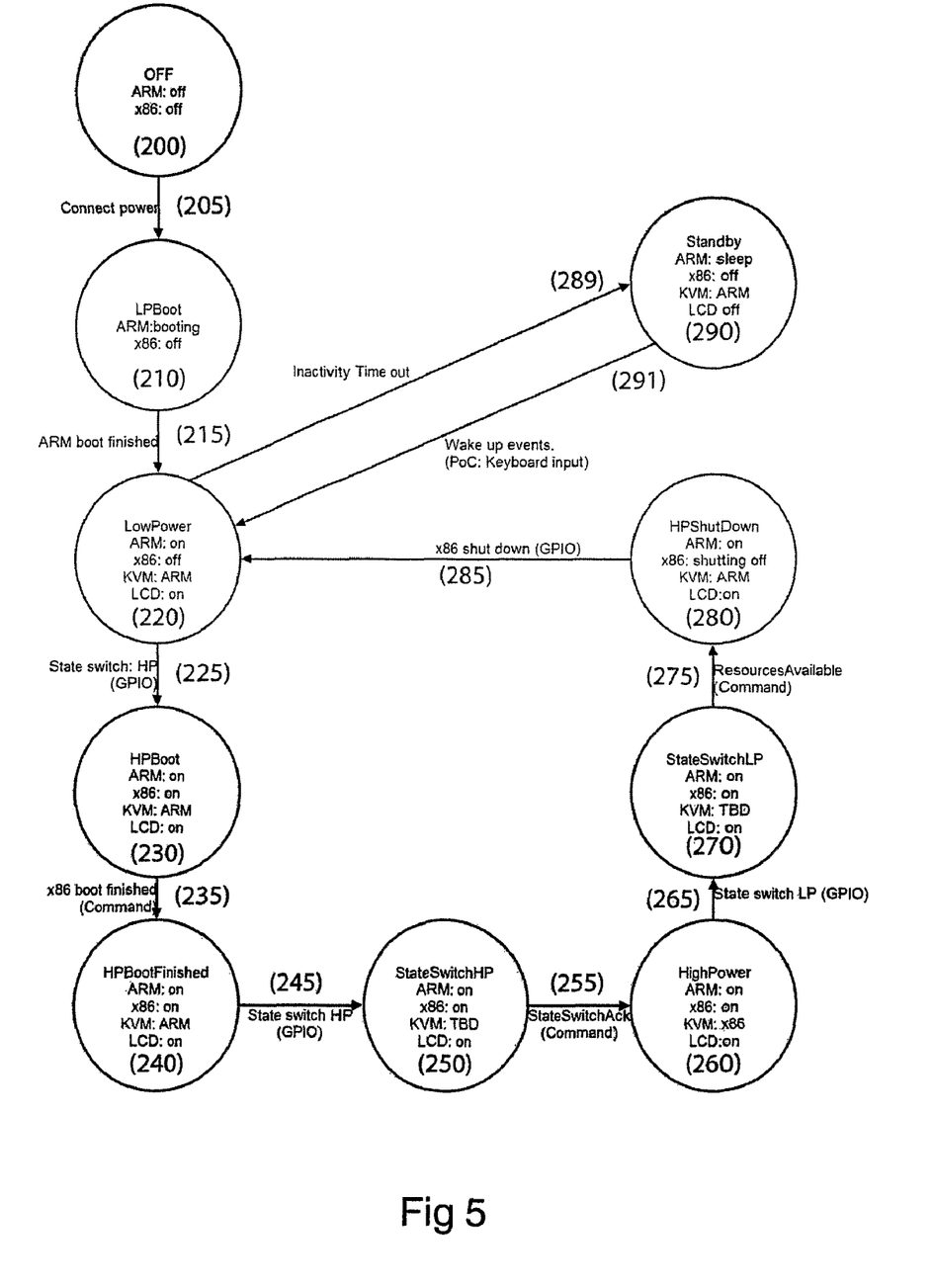
FIG. 5 presents the state diagram for the process of moving the execution of application programs between the low- and high-performance sub-systems.

The possible state-switching logic according to the present invention is given in FIG. 5. Minor variants may occur dependent on implementations of the present invention.

It starts—state 200—with the combined system being powered off: both subsystems, here being represented by the x86 known from the PC, and the ARM processor, typically applied in embedded applications such as mobile phones and PDA's.

Upon powering-on—transition 205—from OFF-state 200 the LPBoot process begins.

State 210 is entered. Still the x86 remains off while the ARM is booting. After booting, the ARM enters state 220 (low power mode). After transition 215 ARM boot is finished.

The low-performance subsystem is now in state 220 "Low Power Mode". In this state the ARM is in control of the device. This mode of operation allows users to perform various computing tasks with full access to peripheries on the device (such as hard drives and embedded radio frequency devices, cameras, other). With an ARM processor such tasks might include light office work, editing of documents, Use of calendar, email, music playback, video playback, personal entertainment programs and similar activities.

On a signal given the system enters 225 the state 230 and the high-performance x86 type processor starts its boot/resume routine. In state 230 the x86 is executing its boot sequence and gathers desktop and user environment information from database(s). The desktop, the user I/O and environment (that is pointing devices, character input and shared desktop, user settings for instance) remain in the control of the low-performance processor. The user may be notified of this process via UI cue otherwise it is undisturbed by said process. A signal transfers 235 the system over to state 240 indicating that the x86 has finished its boot sequence. At this point both processors and OS are running. Here error checking and data hand off for desktop and user environment may occur. The desktop and the user I/O and environment (that is pointing device, character input and shared desktop) still remain under the control of the low-performance processor.

The transition 245 shows that the processes of state 240 have been completed and state 250 is entered where switching user I/O between respective subsystems occurs. This may be characterized by a momentary flicker on the display means. An image from BIOS may be displayed, an on-screen timer, or other UI niceties may be used.

Transition 255 makes the system indicating that hand off of user I/O is complete and arriving in state 260—"Full power mode". In this mode the x86 controls both the UI and peripheries.

Transition 265 upon a signal transfers into state 270, making the x86 to start to shutdown, 'hibernate' or 'sleep', switching user I/O between respective subsystems. This again may be characterized by a momentary flicker on the screen. User environment is described for ARM system. An image from BIOS may be displayed, an on-screen timer, or other UI niceties may be used.

After transition 275 hand off of user I/O is complete and the system arrives at state 280—"Low Power Mode". In this state the low-performance subsystem is in control of the device. This mode of operation allows users to perform various computing tasks with full access to peripheries on the device (such as hard drives and embedded radios). With an ARM processor such tasks might include light office work, editing of documents, use of calendar, email, music playback, video playback, personal entertainment programs and similar activities.

The transition 285 indicates the x86 shutdown/sleep/hibernation process continues until completed. The system arrives at state 220 again.

A timeout function during this state can transfer 289 the system into state 290, a standby state where even the ARM is in a sleep-mode, some user I/O is off, the whole system consuming even less power. Any wake-up event (PoC—Point of Contact, ex. keyboard input, incoming call on GPRS, calendar event) will initiate the opposite transition 291 and put the system in state 220.

Figure 8:
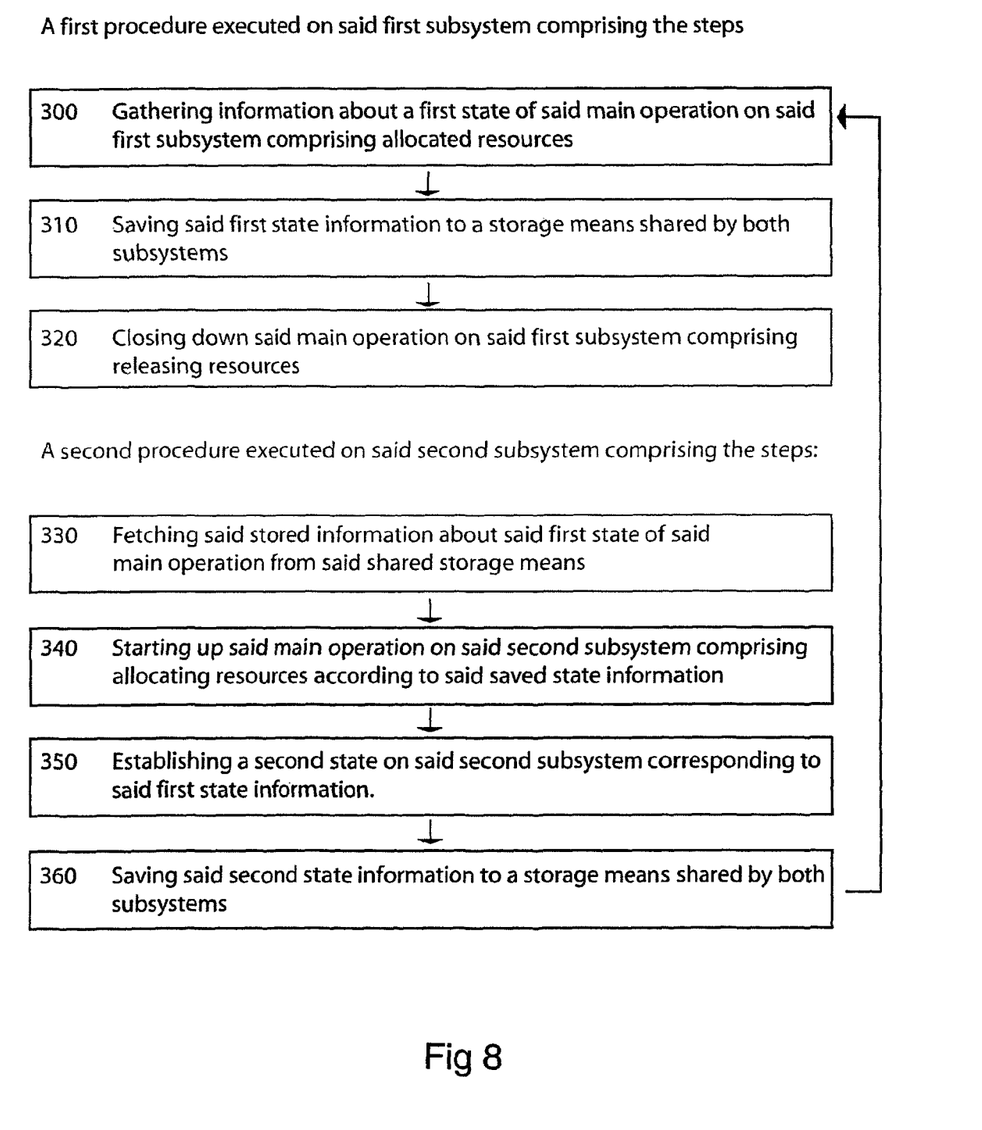

The invention concerns also a method according to the flow chart in FIG. 8 to coordinate the two subsystems in order to transparently move the software to be executed between the subsystems making these subsystems to act as a single computing device.

The method comprises two procedures, the first procedure executed on the first subsystem comprising the steps: (a) gathering information about the state of the software on the first subsystem including information about allocated resources (300); then (b) storing the this state information to a storage means shared by both subsystems (310), and (c) closing down the software on the first subsystem including releasing/unmounting the resources (320). The second procedure executes on the second subsystem and includes the steps (i) fetching the stored information about the first state of the software from the shared storage means (330), (ii) starting up the software on the second subsystem comprising also allocating/mounting the resources according to the above mentioned saved state information (340), (iii) establishing a second state on the second subsystem corresponding to information about the first state (350), and (iv) saving the second state information to a storage means shared by both subsystems (360).

In a typical embodiment a final step (d) in the first procedure comprises putting the first subsystem into a passive, power saving state.

According to one embodiment of the invention parts of the state information on the storage means are updated dynamically, when these part are observed to change on the subsystem, are updated sequentially as the operating system is in process, or are updated as system resources become available to execute background tasks.

Generally speaking the present invention can be embodied as combinations of software and hardware modules, but will typically be implemented as a set of hardware gate logic optimized for use in a given chipset and integral with the mentioned input/output hub ("Southbridge").

The invention claimed is:

1. A data processing system comprising
a high-performance computing subsystem having high power consumption (HP subsystem),
a low-performance computing subsystem having lower power consumption (LP subsystem) than said HP subsystem, and
a controller comprising a set of interfaces to said HP subsystem,
said HP subsystem comprising a first operating system, a first main processor, a first graphical processor and a first storage;
said LP subsystem comprising a second operating system, a second main processor, a second graphical processor and a second storage; and
wherein said LP subsystem
is operatively in close integration to said controller, and arranged to boot in an initial step from off (200) to power-on (205), keeping said HP sub-system powered-off (210) and to enter (215) a wait state (220), alternatively a state of standby (290) when an inactivity timeout occurs (289) and to return to said wait state (220) on a wake-up event (291); is configured to control said data processing system to act as a single computing device by moving software execution to one of a) said HP subsystem when high computing performance is needed (225) by booting said HP subsystem (230, 235) into a booted state (240), transferring control of user interface means to said HP subsystem and running said software to be executed (245, 250, 255, 260),
b) said LP subsystem when low computing performance is sufficient, by transferring control of user interface means to said LP sub-system, stopping said software to be executed, releasing resources (270, 275);
allowing in case b) to put said HP subsystem into a power saving mode finally arriving at step (280, 285, 220).

2. Data processing system according to claim 1,
characterized in that said LP subsystem performs at least one task even when said HP subsystem is actively executing said software.

3. Data processing system according to claim 1,
characterized in that said data processing system retains said user interface and a use of peripheral devices independent of, on which one of said subsystems said software is executed.

4. Data processing system according to claim 1,
characterized in that said subsystems use operating systems being adapted to their respective computing performance.

5. Data processing system according to claim 1,
characterized in that a display means is controlled by
said LP subsystem while said HP subsystem is in said power saving state, and
said HP subsystem while said HP subsystem is executing said software.

6. Data processing system according to claim 1,
characterized in that at least one communication link interconnects said HP subsystem with said LP subsystem.

7. Data processing system according to claim 6,
characterized in that said communication link provides said connection to an input/output hub on said HP subsystem.

8. Data processing system according to claim 7,
characterized in that peripheral devices are shared using said communication link.

9. Data processing system according to claim 1,
characterized in that said subsystems share a basic input/output system.

10. Data processing system according to claim 1,
characterized in that a decision on which of said subsystems said execution of said software shall be moved in, is indicated by a switch being at least one of
a physical switch,
a selector as a part of said user interface on said display means, and
a result of evaluating a set of predetermined factors internal to said data processing system.

11. Data processing system according to claim 10,
characterized in that said switch is arranged to change a connection of peripheral devices to said subsystem, said subsystem being indicated to execute said software.

12. Data processing system according to claim 11,
characterized in that said LP subsystem is detachable from said data processing system, providing—together with necessary power supply and user interface means—a stand-alone data processing system.

13. Data processing system according to claim 1,
characterized in that said low-performance subsystem (LP) is used for at least one of multitasking and server/client protocols within said data processing system, executing tasks on behalf of said HP subsystem.

14. Data processing system according to claim 1,
characterized in that said low-performance subsystem (LP) acts as a slave processor for said high-performance subsystem (HP).

15. Data processing system according to claim 1, characterized in that said LP subsystem is arranged to handle 'always-on' tasks.

16. Data processing system according to claim 15,
characterized in that said 'always-on'-tasks comprise drivers for radio input/output, audio-applications, wake-up functions.

17. Data processing system according to claim 1,
characterized in that said low-performance subsystem (LP) acts as a server for said high-performance subsystem (HP).

18. Data processing system according to claim 1,
characterized in that said data processing system is based on 'core logic' architecture, and said controller is part of said core logic.

19. A method to coordinate a LP subsystem and a HP subsystem in a data processing system in order to transparently move a software to be executed between said subsystems making said subsystems to act as a single computing device, the HP subsystem comprising a first operating system, a first main processor, a first graphical processor and a first storage, and the LP subsystem comprising a second operating system, a second main processor, a second graphical processor and a second storage;
the method comprising:
  a) booting said LP subsystem from off (200) to power-on (205), keeping said HP subsystem powered-off (210);
  b) entering (215) a wait state (220);
  c) on a need for high computing performance (225), booting said HP subsystem (230, 235) entering a booted state (240);
  d) transferring control of user interface means to said HP subsystem and running said software to be executed (245, 250, 255, 260);
  e) on an annulment of said need (265) for high computing performance, transferring control of said user interface means to said LP subsystem stopping said software to be executed, releasing resources (270, 275);
  f) transferring said HP subsystem into a power-saving mode, finally arriving at step b) (280, 285, 220).

20. Method according to claim 19,
characterized in step b) comprising alternatively to enter a state of standby (290) when an inactivity timeout occurs (289) and returning to said wait state (220 on a wake-up event (291).

21. Method according to claim 19,
characterized in stopping said software to be executed and saving a reentry point on one of said subsystems—a first subsystem—by running a first procedure on said first subsystem comprising the steps:
  a) gathering information about a first state of said software on said first subsystem comprising allocated resources (300),
  b) storing said first state information to a storage means shared by both subsystems (310), closing down said software on said subsystem comprising releasing resources (320), and
  c) putting said first subsystem into a passive power saving state.

22. Method according to claim 21,
characterized in that parts of said state information on said storage means are changed dynamically, when said part of said state information is changed.

23. Method according to claim 21,
characterized in that parts of said state information on said storage means are updated sequentially as said operating system is in process.

24. Method according to claim 21,
characterized in that parts of said state information on said storage means are updated as system resources become available to execute background tasks.

25. Method according to claim 19,
characterized in starting said software to be executed from a defined start point on one of said subsystems not being said first subsystem—a second subsystem—by running a second procedure on said second subsystem comprising the steps:
  i) fetching said stored information about said first state of said software from said shared storage means (330),
  ii) starting up said software on said second subsystem comprising allocating resources according to said saved state information (340),
  iii) establishing a second state on said second subsystem corresponding to said first state information (350),
  iv) saving said second state information to said storage means shared by both subsystems (360).

\* \* \* \* \*